(12) United States Patent
Nakamaki

(10) Patent No.: US 8,625,140 B2
(45) Date of Patent: Jan. 7, 2014

(54) DEVICE THAT PERFORMS MULTIPLE IMAGE FORMATION PROCESSES BASED ON COMMANDS SENT FROM A HOST COMPUTER

(75) Inventor: Motohiro Nakamaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 13/207,243

(22) Filed: Aug. 10, 2011

(65) Prior Publication Data

US 2012/0062921 A1    Mar. 15, 2012

(30) Foreign Application Priority Data

Sep. 13, 2010    (JP) ................................. 2010-203953

(51) Int. Cl.
*G06F 3/12*    (2006.01)
*H04N 1/46*    (2006.01)

(52) U.S. Cl.
USPC ......................................... 358/1.15; 358/505

(58) Field of Classification Search
USPC .................... 358/1.13, 1.15, 1.16, 505; 710/6
See application file for complete search history.

(56) References Cited

U.S. PATENT DOCUMENTS

| 5,036,476 | A | 7/1991 | Yamaguchi et al. |
| 5,726,769 | A | 3/1998 | Imai et al. |
| 5,930,004 | A | 7/1999 | Imai et al. |
| 6,333,794 | B2 | 12/2001 | Imai et al. |
| 6,711,626 | B1 * | 3/2004 | Okada ............................... 710/5 |
| 7,395,121 | B2 | 7/2008 | Aoki |
| 2008/0018957 | A1 * | 1/2008 | Suzuki .......................... 358/474 |

FOREIGN PATENT DOCUMENTS

| JP | 06-091654 A | 4/1994 |
| JP | 06-253107 A | 9/1994 |
| JP | 08-123639 A | 5/1996 |
| JP | 08-137639 A | 5/1996 |
| JP | 2002-165047 A | 6/2002 |
| JP | 2006-211561 A | 8/2006 |

* cited by examiner

*Primary Examiner* — Eric A Rust

(57) ABSTRACT

A hybrid device that can perform plural operations can switch quickly between operating modes. The hybrid device can perform plural processes on a processed medium based on commands sent from a host computer 200. If a scan command instructing a optical reader 110, which is another process unit, to scan the processed medium is received while executing a print command for a printing process on the medium, the control unit 70 sets the scan command to a command execution standby state, finishes executing the print command, and after the print command is completed executes the scan command queued in the command execution standby state.

8 Claims, 8 Drawing Sheets

DEVICE THAT PERFORMS MULTIPLE IMAGE FORMATION PROCESSES BASED ON COMMANDS SENT FROM A HOST COMPUTER

CROSS-REFERENCE TO RELATED APPLICATION

This application claims priority under 35 U.S.C. §119 to Japanese Patent Application No. 2010-203953, filed on Sep. 13, 2010, the entire disclosure of which is expressly incorporated by reference herein.

BACKGROUND

1. Technical Field

The present invention relates to a hybrid device that performs multiple processes based on commands sent from a host computer, to a control method for the hybrid device, and to a recording medium.

2. Related Art

Electronic devices also known as hybrid devices that can perform multiple operations on a processed medium, including optically reading the processed medium and printing on the processed medium, are known from the literature. These hybrid devices include devices that operate according to commands sent from a personal computer or other host computer. See, for example, Japanese Unexamined Patent Appl. Pub. JP-A-H06-253107.

The commands that are used with a hybrid device that has plural process units and performs plural operations as described above normally uses a different command group (command system) for process units that perform different functions, and switching operation between different process units involves changing the command system. However, operation can be changed only at specific times when changing the command system is possible, such as after a sequence of plural commands related to a single operation sent from the host computer have all been executed. Frequently switching operation between plural process units is therefore difficult. When plural operations are performed consecutively, for example, an opportunity (timing) for changing command systems may not come soon, and it may take some time before the operating mode can be changed.

SUMMARY

A hybrid device according to the invention that can perform the operations of plural process units can quickly change operations.

A first aspect of the invention is a hybrid device that can connect to a host computer, including: at least a first process unit and a second process unit; a storage unit that stores a first command group used with the first process unit and a second command group used with the second process unit; and a command execution control unit that performs a process on a processed medium based on a command of the first command group received from the host computer, and performs a process on the processed medium based on a command of the second command group received from the host computer, wherein if the command execution control unit receives a separate process command of the second command group controlling applying a separate process of the second process unit to the processed medium before or while executing a specific process command of the first command group that specifies applying a specific process of the first process unit to the processed medium, the command execution control unit executes or continues a specific process command of the first command group after setting the separate process command of the second command group to the command execution standby state, and after completing the specific process of the first command group executes the separate process command of the second command group queued in the command execution standby state.

With this aspect of the invention, a hybrid device that has plural process units including at least a first process unit and a second process unit and can perform plural processes on the same processed medium has different command groups for controlling the different process units. If a command that belongs to a different command group for a different process is received before or while performing a specific process based on commands for one of the command groups, the hybrid device interprets the already received commands and checks and prepares the other process unit (second process unit) for operation, sets the process based on the received command to a command execution standby state and then performs the specific process by the first process unit, and after this specific process is completed, executes the command queued in the command execution standby state. As a result, when plural processes are performed on a single processed medium by plural process units controlled by different command groups, operation can switch quickly from the one process to another process controlled by a different command group, the delay required for process switching can be shortened, and throughput can be improved.

Preferably in another aspect of the invention, the hybrid device also has a first reception unit for the first command group and a second reception unit for the second command group that store commands received from the host computer. The command execution control unit references the second reception unit before or while executing a specific process command stored in the first reception unit, and if a command is stored in the second reception unit, sets said command as the separate process command queued in the command execution standby state.

This aspect of the invention has a plurality of reception units (receive buffers) for the plural different command groups of the different process units, and by referencing the receive buffer for another command group before or while executing a specific process command stored in the receive buffer for one command group, a command received for another process executed by another process unit can be set to a command execution standby state before or while executing a specific process of the one process unit, and executed next. Commands for a different process unit can therefore be easily referenced by switching to a different receive buffer, and processes and command groups can be changed quickly.

Further preferably in another aspect of the invention, the first command group and second command group are different.

If the commands associated with each process unit are commands that demarcate information contained in the commands with specific rules, command groups (command systems) for different process units can be easily differentiated. The receive buffer can also be switched according to the command group.

Further preferably in another aspect of the invention, the storage unit stores a specific configuration condition; and the command execution control unit references the second reception unit when the specific configuration condition is satisfied before or while executing the specific process command, and does not reference the second reception unit when the specific configuration condition is not satisfied.

When a command in one command group meets a specific condition, such as a specific process ends, the receive buffer for another command group can be referenced and commands for a different process queued in a command execution standby state. The operating process can therefore be changed quickly according to specific conditions.

Yet further preferably in another aspect of the invention, when the specific configuration condition is not satisfied before or while executing the specific process command, the command execution control unit executes a command from the first reception unit where the specified process command was stored after completing execution of the specific process command.

When the specific condition is not satisfied in this aspect of the invention, executing processes in the same command group can continue without frequently changing the process.

In a hybrid device according to another aspect of the invention, the first process unit is a printing unit; the second process unit is a reading unit; and the command execution control unit performs a printing process of the print unit on the processed medium based on a command of the first command group received from the host computer, and performs a reading process of the reading unit on the processed medium based on a command of the second command group received from the host computer.

This aspect of the invention enables quickly and freely switching between printing and scanning operations that use different command groups to process the same processed medium.

Another aspect of the invention is a control method for a hybrid device that has at least a first process unit and a second process unit and can connect to a host computer, wherein: if a separate process command of the second command group controlling applying a separate process of the second process unit to the processed medium is received before or while executing a specific process command of the first command group that specifies applying a specific process of the first process unit to the processed medium, the specific process command of the first command group executes or continues after setting the separate process command of the second command group is set to the command execution standby state, and the separate process command of the second command group queued in the command execution standby state executes after the specific process of the first command group ends.

By executing the control method according to this aspect of the invention, a hybrid device that has at least a first process unit and a second process unit and can perform plural processes on the same processed medium has different command groups for controlling the different process units. If a command that belongs to a different command group for a different process is received before or while performing a specific process based on commands for one of the command groups, the hybrid device interprets the already received commands and checks and prepares the other process unit (second process unit) for operation, sets the process based on the received command to a command execution standby state and then performs the specific process by the first process unit, and after this specific process is completed, executes the command queued in the command execution standby state. As a result, when plural processes are performed on a single processed medium by plural process units controlled by different command groups, operation can switch quickly from the one process to another process controlled by a different command group, the delay required for process switching can be shortened, and throughput can be improved.

Another aspect of the invention is a storage medium that stores a program that can be executed by a control unit that controls at least a first process unit and a second process unit of a hybrid device that can connect to a host computer, whereby: if a separate process command of the second command group controlling applying a separate process of the second process unit to the processed medium is received before or while executing a specific process command of the first command group that specifies applying a specific process of the first process unit to the processed medium, the specific process command of the first command group executes or continues after setting the separate process command of the second command group is set to the command execution standby state, and the separate process command of the second command group queued in the command execution standby state executes after the specific process of the first command group ends.

As a result of the control unit executing the program according to this aspect of the invention, a hybrid device that has at least a first process unit and a second process unit and can perform plural processes on the same processed medium has different command groups for controlling the different process units. If before or while performing a specific process based on commands for one of the command groups a command that belongs to a different command group for a different process is received, the hybrid device interprets the already received commands and checks and prepares the other process unit (second process unit) for operation, sets the process based on the received command to a command execution standby state and then performs the specific process by the first process unit, and after this specific process is completed, executes the command queued in the command execution standby state. As a result, when plural processes are performed on a single processed medium by plural process units controlled by different command groups, operation can switch quickly from the one process to another process controlled by a different command group, the delay required for process switching can be shortened, and throughput can be improved.

Effect of the Invention

When plural processes are applied to a single processed medium, the invention enables quickly changing from one process to another process, shortens the delay accompanying process changes, and improves throughput.

DESCRIPTION OF EMBODIMENTS

A preferred embodiment of the present invention is described below with reference to the accompanying figures.

Figure 1:
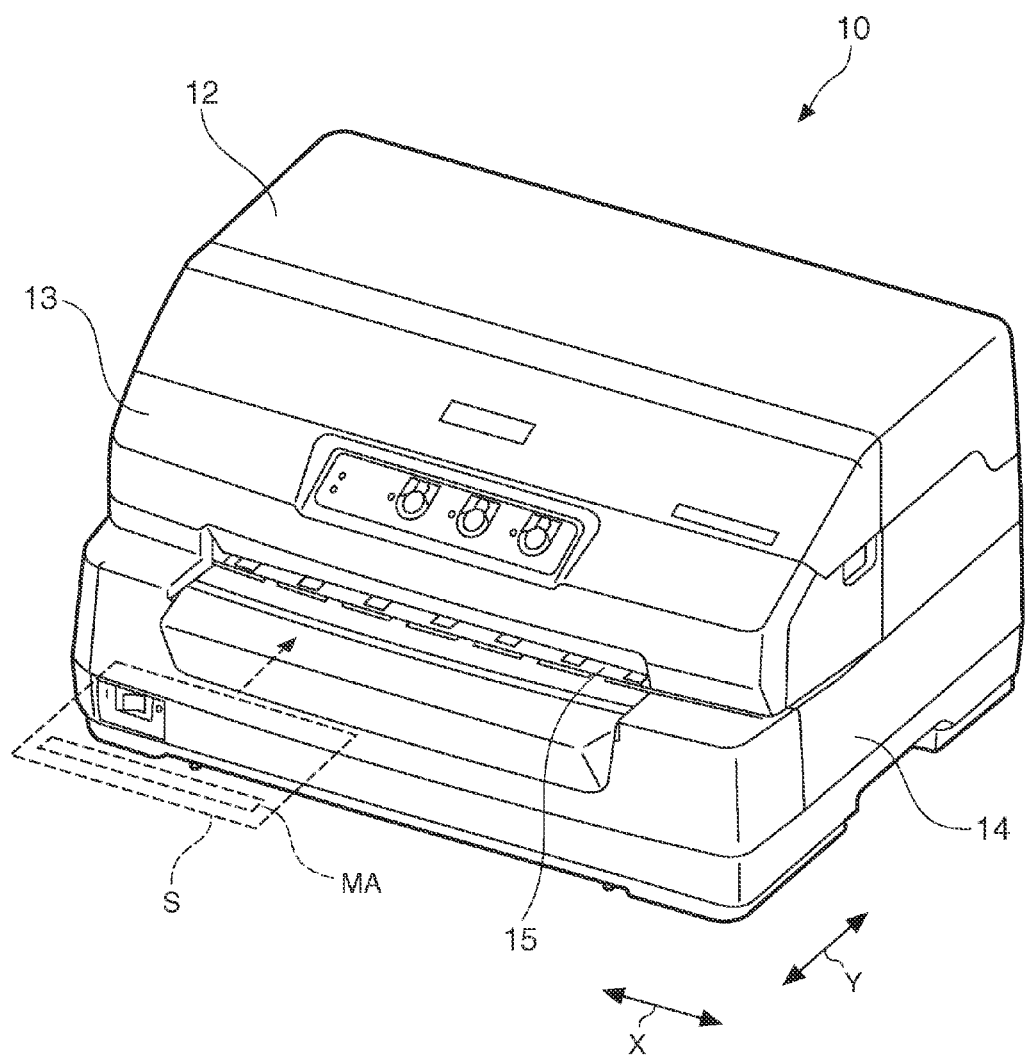
FIG. 1 is an external oblique view of a hybrid device according to a preferred embodiment of the invention.
Figure 2:
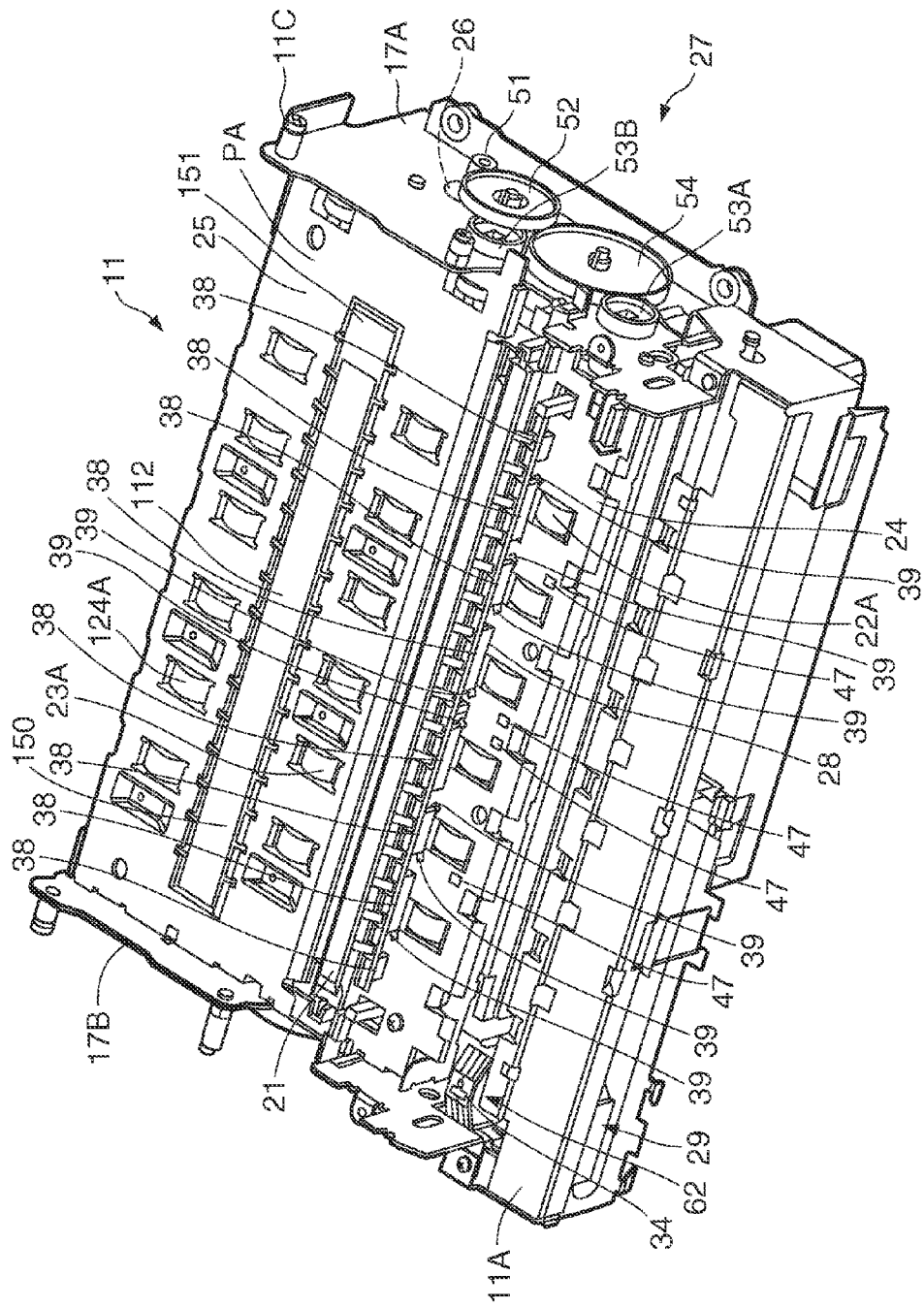
FIG. 2 is an oblique view of the main assembly of the hybrid device.
Figure 3:
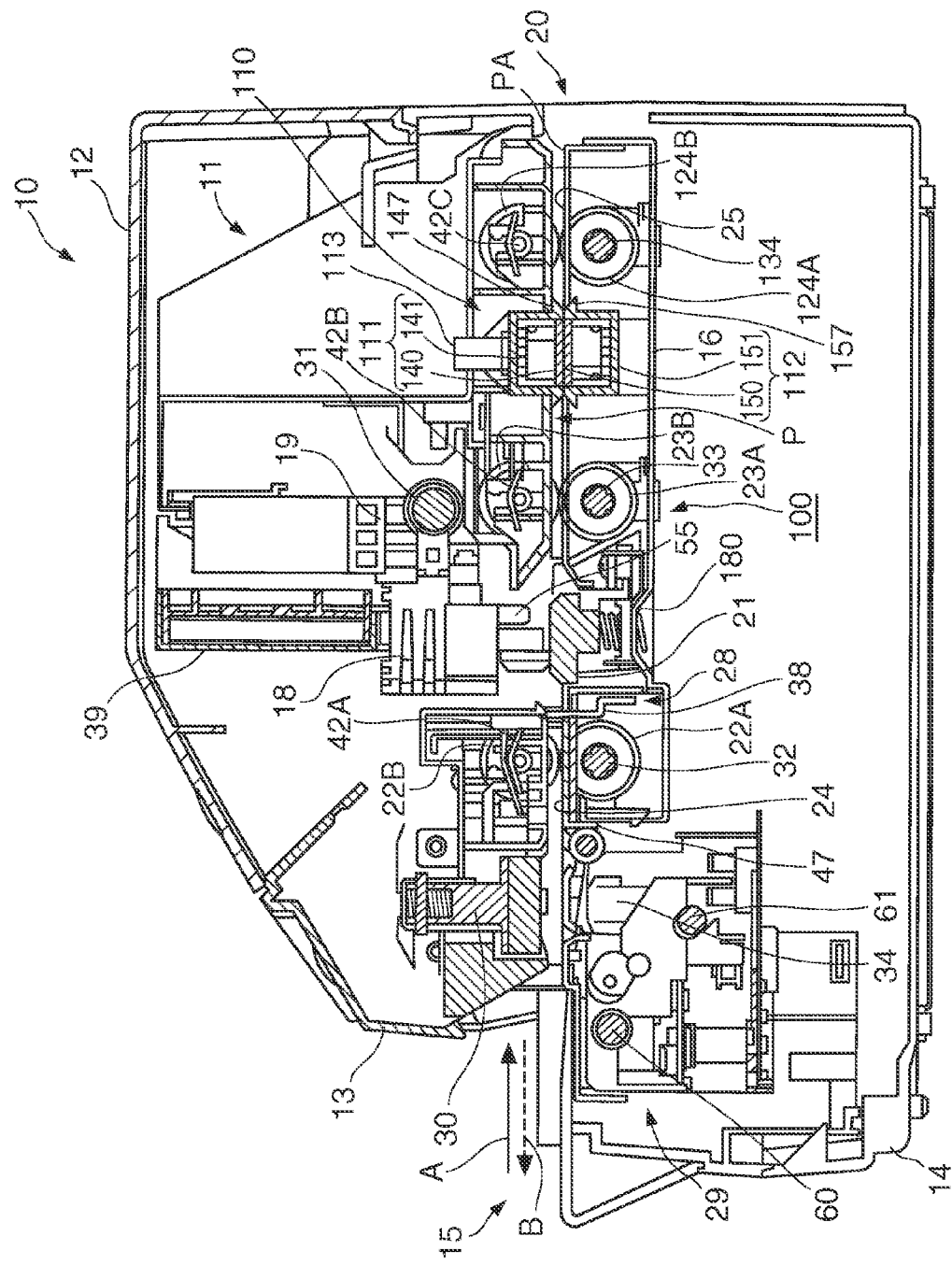
FIG. 3 is a side section view of the main assembly.

FIG. 1 is a front oblique view showing the appearance of a hybrid device according to a preferred embodiment of the invention. FIG. 2 is an external oblique view of the main assembly 11. FIG. 3 is a side section view of the hybrid device 10 in FIG. 1.

The hybrid device 10 shown in FIG. 1 has a printer function for printing on the recording medium S (processed medium) by a serial impact dot matrix (SIDM) recording head 18 ((see FIG. 3); an MICR (magnetic ink character recognition) function for reading characters recorded with magnetic ink on the recording medium S; an MSR (magnetic stripe reader) function for reading and writing information recorded on a magnetic stripe disposed to the recording medium S; and a scanner function for optically scanning both sides of the recording medium S by an optical reader 110 (see FIG. 3).

The hybrid device 10 can perform a printing operation using the printer function, a magnetic ink character reading operation using the MICR function, magnetic stripe read/write operations using the MICR function, and a scanner operation using the scanner function on the recording medium S, and can continuously perform these plural processes (operations) on a single recording medium S.

Cut-sheet media that is precut to a certain length, and continuous media having numerous sheets connected in a continuous web, are examples of recording media S that can be used in the hybrid device 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to herein as simply checks) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the front of the check. A passbook is a bound booklet of plural blank pages that can be printed on when the passbook is open. A magnetic stripe is typically rendered on the outside surface of one of the passbook covers.

Note that of the four sides of a rectangular recording medium S, the edge on the side that is inserted to the hybrid device 10 is referred to herein as the leading edge or end, and the edge on the opposite end as the leading end is referred to as the trailing edge or end.

As shown in FIG. 1, the hybrid device 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the hybrid device 10 is discharged from the manual insertion opening 15 or the paper exit 20 is controlled by a command sent to the hybrid device 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the hybrid device 10 has a main assembly 11 that is covered by the foregoing case members. The main assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the main assembly 11 is exposed when the top chassis part pivots open.

As shown in FIG. 2 and FIG. 3, the main assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the secondary scanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is flexibly supported and urged toward the recording head 18 by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the main assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media conveyance mechanism 100 that conveys the recording medium S, an alignment mechanism 28 that contacts the leading end of the recording medium S conveyed by the media conveyance mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media conveyance mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media conveyance motor 26, and a drive wheel train 27. The media conveyance mechanism 100 renders a conveyance path P through which the recording medium S is conveyed over the front media guide 24 and rear media guide 25. The tops of the front media guide 24 and rear media guide 25 are conveyance surface PA of the conveyance path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media conveyance motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media conveyance motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media conveyance motor 26 rotates forward, the first drive roller 22A, second drive roller 23A, and third drive roller 124A shown in FIG. 3 convey the recording medium S in the secondary scanning direction Y inside the printer assembly 11 as denoted by arrow A in the figure, and convey the recording medium S in the direction in which it is discharged from the printer assembly 11 as indicated by arrow B in the figure when the media conveyance motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the conveyance path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the conveyance path P arrayed in the main scanning direction near the upstream side of the alignment plates 38, and are transmissive sensors including a light-emitting unit (such as an LED) and a photodetection unit (such as a phototransistor) disposed with the conveyance path P therebetween. Whether the skew of the recording medium S to the conveyance direction after alignment by the alignment mechanism 28 is within the allowable range can be determined from the number and positions of the plural alignment sensors 39 that detect the leading end of the recording medium S.

The hybrid device 10 has a control circuit board (not shown in the figure) located behind and below the main assembly 11, for example, as a control unit that controls hybrid device IO operations, including driving the media conveyance motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the conveyance path P in front of the first drive roller 22A. The media edge sensors 47 are reflective sensors having a light-emitting unit that emits light toward the conveyance path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the conveyance path P therebetween. This configuration determines that a recording medium S was inserted to the conveyance path P when the photodetection units of all insertion detection sensors 47 sense light and then detection of light by any one of the insertion detection sensors 47 is blocked.

As shown in FIG. 3, the main assembly 11 has an optical reader 110 that reads text, symbols and images presented on the surface of the recording medium S. The optical reader 110 includes a first scanner module 111 that reads information printed or otherwise presented on the top surface of the recording medium S, and a second scanner module 112 disposed opposite the first scanner module 111 that similarly reads information printed or otherwise presented on the bottom surface of the recording medium S. The recording medium S is normally inserted from the manual insertion opening 15 so that the side on which the MICR information is printed is on the bottom.

The first scanner module 111 and second scanner module 112 are optical image sensors that are disposed between the second drive roller 23A and third drive roller 124A and continuously read information from the recording medium S conveyed through the conveyance path P.

The first scanner module 111 and second scanner module 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the reading area of the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner module 111 and second scanner module 112 are not limited to CIS scanners, however, and CCD (charge coupled device) scanners may be used instead.

As shown in FIG. 2, the second scanner module 112 has a support frame 151 and glass plate 150 extending lengthwise across the width of the hybrid device 10 parallel to the platen 21. The support frame 151 is disposed so that the top surface of the glass plate 150 is exposed to the conveyance path P through a window formed in the rear media guide 25. The first scanner module 111 is disposed above the second scanner module 112 as shown in FIG. 3 so that the bottom surface of the glass plate 140 is opposite the top of glass plate 150, and likewise extends in the main scanning direction with substantially the same length as the second scanner module 112.

An urging member 113 is disposed above the first scanner module 111, and the first scanner module 111 is urged toward the recording medium S on the rear media guide 25 by the urging member 113. The urging member 113 pushes the first scanner module 111 to the second scanner module 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner module 111 is pushed up by the conveyed recording medium S and the urging member 113 contracts, allowing the recording medium S to pass between the glass plates 140, 150. More specifically, the scanning quality of the optical reader 110 is improved by the first scanner module 111 that is urged by the urging member 113 pushing the recording medium S to the second scanner module 112 side so that the recording medium S reliably contacts the surfaces of the glass plates 140, 150.

The photosensors (not shown in the figure) of the first scanner module 111 and second scanner module 112 are arrayed in a row in the main scanning direction of the hybrid device 10, and scan lines extending in the main scanning direction. The photosensors of the first scanner module 111 and second scanner module 112 are disposed across a wider range in the main scanning direction than the printing range of the recording head 18, and can scan a wider range than any recording medium that can be printed on by the hybrid device 10. The optical reader 110 can therefore read the entire surface of any recording medium S that can be used in the hybrid device 10.

The first scanner module 111 and second scanner module 112 are disposed on opposite sides of the conveyance path P as shown in FIG. 3, but the photosensor line in the first scanner module 111 and the photosensor line in the second scanner module 112 are offset approximately 5 mm from each other in the conveyance direction of the recording medium S. This configuration eliminates the effect of light from one light source on the other photosensor and results in higher scanning quality.

The first scanner module 111 and second scanner module 112 each have R, G, and B light sources, and can scan in both monochrome (binary, 16 level, 256 level gray scale) and color modes. The scanning resolution of the first scanner module 111 and second scanner module 112 can be set to one of three levels, 200 dpi (dots/inch), 300 dpi, and 600 dpi. The number of scan lines in the conveyance direction of the recording medium S (the secondary scanning direction Y) is set according to the scanning resolution in the main scanning direction, and the conveyance speed of the recording medium S during scanning is adjusted according such parameters as the scanning resolution and how fast the photosensor output signals can be processed.

Figure 4:
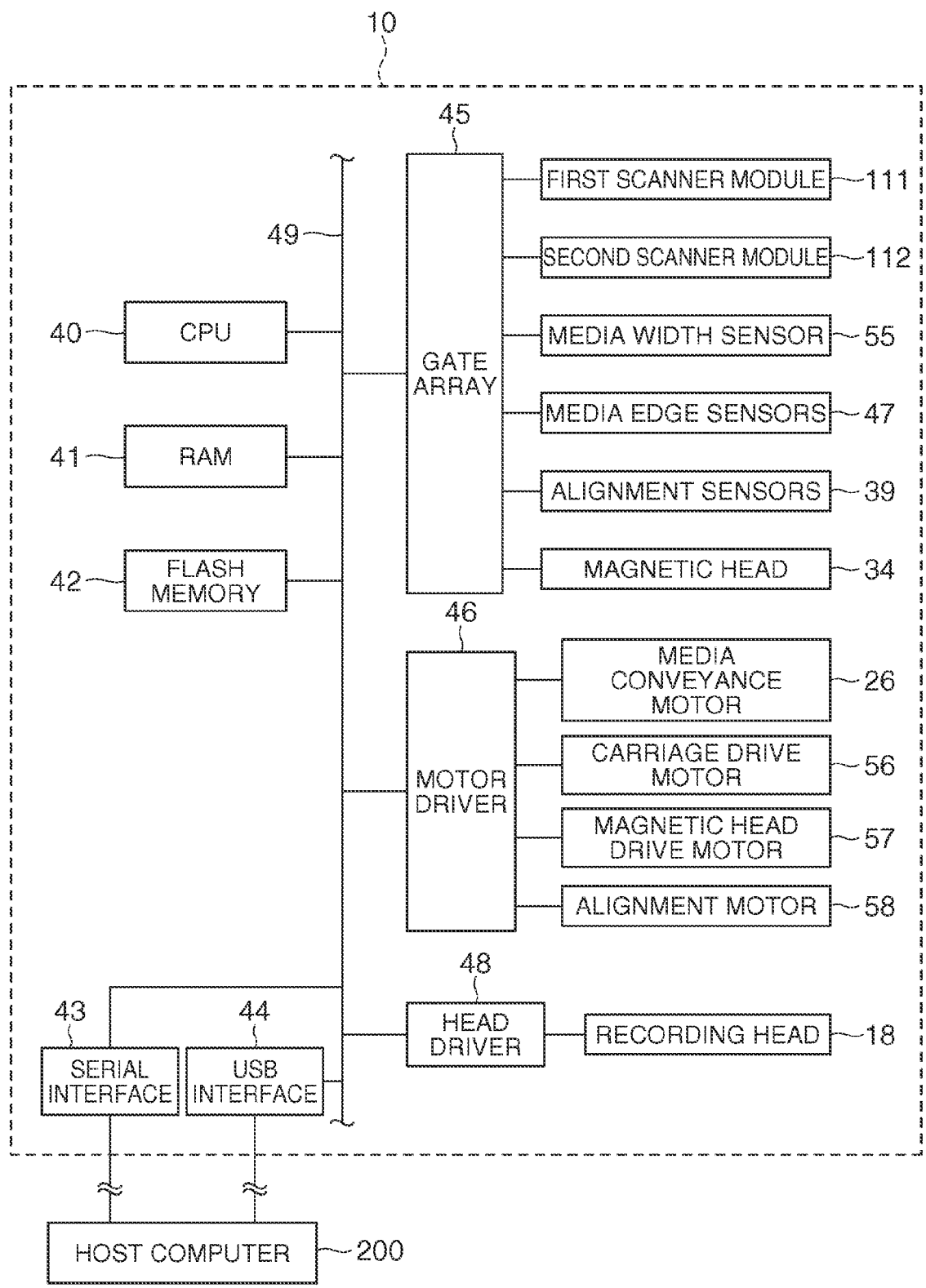
FIG. 4 is a block diagram of the control system of the hybrid device.

FIG. 4 is a block diagram showing the control configuration of the hybrid device 10.

The parts shown in FIG. 4 can be rendered by the cooperation of hardware components disposed to the control circuit board (not shown in the figure) and software.

The hybrid device 10 includes a CPU 40 that controls the hybrid device 10 based on a control program, RAM 41 that temporarily stores data and a control program read from flash memory 42 (storage unit) by the CPU 40, flash memory 42 that stores the control program executed by the CPU 40 and processed data, a serial interface 43 and USB interface 44 that convert the data format when communicating information with the host computer 200 that controls the hybrid device 10, a gate array 45 connected to various sensors, a motor driver 46 that drives motors, a head driver 48 that drives heads, and a bus 49 to which these various parts are connected. Each command system (command group) and the commands that belong to each command system are stored in flash memory 42.

RAM 41 functions as buffer memory, such as a receive buffer 66, 67 (FIG. 5) that temporarily stores commands sent from the host computer 200, and an image buffer that temporarily stores image data captured by the optical reader 110.

The alignment sensors 39, media edge sensors 47, media width sensor 55, first scanner module 111 and second scanner module 112 are connected to the gate array 45. The gate array 45 quantizes the analog voltages input from the alignment sensors 39, media edge sensors 47, and media width sensor 55, and outputs the resulting digital data to the CPU 40. The first scanner module 111 and second scanner module 112 optically read the surface of the recording medium S using a CIS, supply the detection voltages from each pixel of the CIS to the gate array 45, and the gate array 45 quantizes the analog voltages supplied from the first scanner module 111 and second scanner module 112 and outputs the resulting digital data to the CPU 40.

The magnetic head 34 is also connected to the gate array 45. The gate array 45 outputs a read/write drive current to the magnetic head 34, detects the analog detection voltage of the magnetic head 34 when reading magnetic data, and outputs the voltage as digital data to the CPU 40.

The motor driver 46 is connected to the media conveyance motor 26, carriage drive motor 56, magnetic head drive motor 57, and alignment motor 58, supplies drive current and drive pulses to the motors, and thus causes the motors to operate.

Note also that an alignment motor 58 (FIG. 4) for operating the alignment plate 38 (FIG. 3) may also be connected to the motor driver 46.

The head driver 48 is connected to the recording head 18, and supplies drive current to the recording head 18 to drive the recording wires to print.

The CPU 40 acquires detection signals from the sensors and drives the motors to convey the recording medium S by the gate array 45, motor driver 46, and head driver 48 based on a control program stored in flash memory 42, and drives the heads to record on the recording medium S.

The CPU 40 also conveys the recording medium S by the media conveyance mechanism 100, and reads the surface of the recording medium S by the gate array 45 and first scanner module 111 and second scanner module 112. While scanning, the CPU 40 temporarily stores the data input from the gate array 45 sequentially to a buffer (not shown in the figure) rendered in RAM 41. The CPU 40 also reads and outputs the image data stored in the buffer (not shown in the figure) to the host computer 200 through the serial interface 43 and USB interface 44.

The printing function, MICR function, MSR function, and optical scanner function described above are rendered by the control system of the hybrid device 10 shown in FIG. 4 controlling driving the parts of the main assembly 11 of the hybrid device 10 to operate according to the commands sent from the host computer 200 as a result of the CPU 40 executing a control program stored in flash memory 42.

Figure 5:
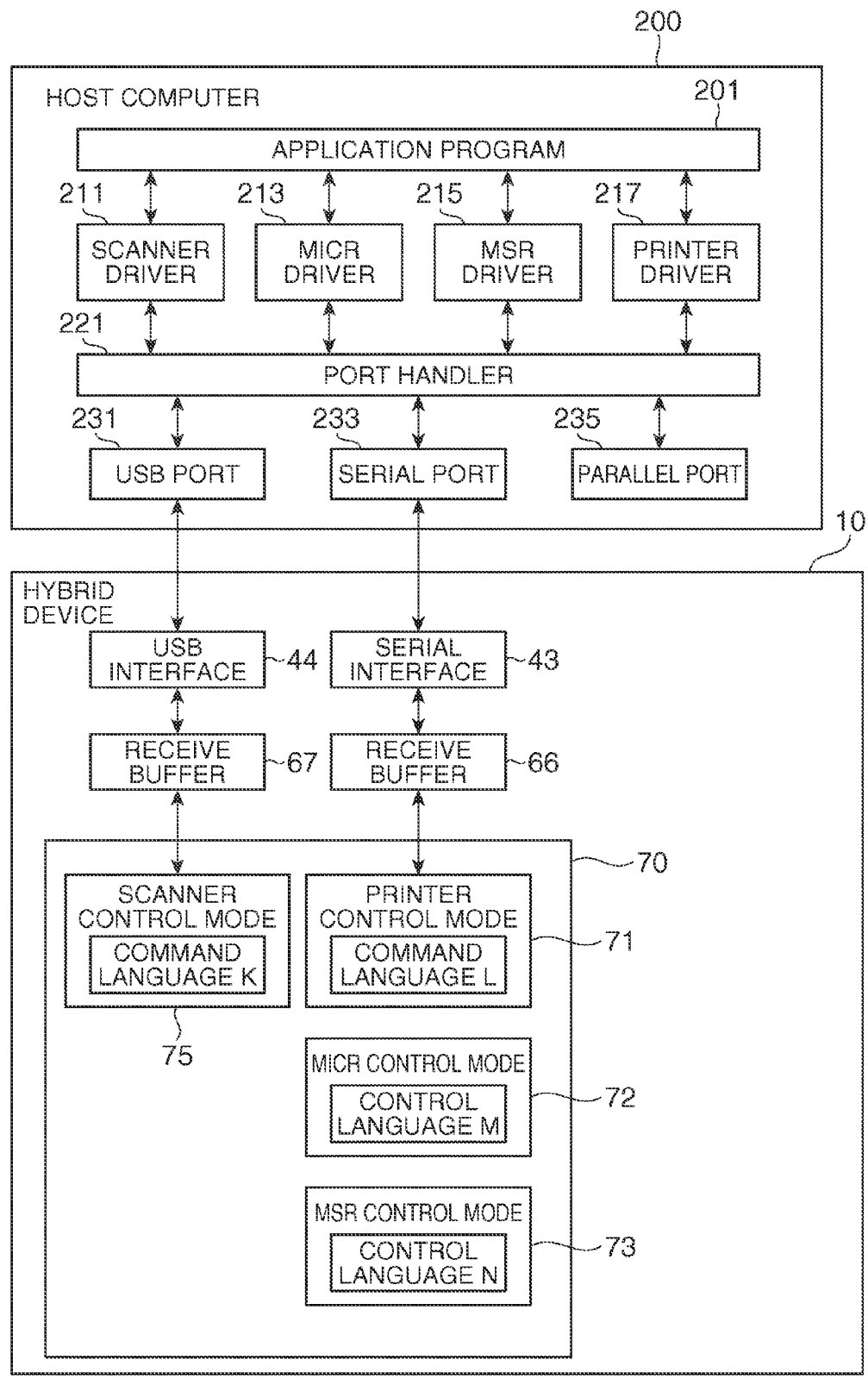
FIG. 5 is a block diagram showing the functional configuration of the host computer and hybrid device.

FIG. 5 is a block diagram showing the functional configuration of the hybrid device 10 and host computer 200.

The host computer 200 renders the functional units shown in FIG. 5 as a result of the CPU 40 executing programs. More specifically, the host computer 200 has an application program 201; various device drivers that render the application program 201 with a scanner driver 211, MICR driver 213, MSR driver 215, and printer driver 217 that provide function modules for controlling the hybrid device 10; and a port handler 221 that assigns the input/output (I/O) ports of the host computer 200 to the different device drivers. The host computer 200 exchanges data and control signals with the hybrid device 10 through the USB port 231, serial port 233, and parallel port 235.

The port handler 221 is achieved as a software construction rendered as a function of the operating system run by the CPU (not shown in the figure) of the host computer 200.

The USB port 231 is rendered by a connector and USB host controller conforming to the USB standard disposed on a hardware circuit board of the host computer 200, and corresponding logical I/O ports of the operating system.

The serial port 233 is rendered by an RS-232C connector and controller conforming to the RS-232C standard disposed on a hardware circuit board, and corresponding logical I/O ports of the operating system.

The parallel port 235 is rendered by a connector and parallel port controller conforming to the IEEE 1284 standard disposed on a hardware circuit board, and corresponding logical I/O ports of the operating system.

The application program 201 is, for example, an application program for processing forms in financial institutions, and includes functions for printing forms, processing checks, and processing passbooks. When these functions are used, the application program 201 outputs requests to the device drivers of the scanner driver 211, MICR driver 213, MSR driver 215, and printer driver 217, and processes data that is input in response to these requests. The hybrid device 10 executes actions including printing on passbooks, printing on checks, reading MICR text from checks, reading magnetic stripes on passbooks, and scanning passbooks and both sides of checks.

The devices drivers of the scanner driver 211, MICR driver 213, MSR driver 215, and printer driver 217 manage hybrid device IO operation by generating and outputting commands for executing the requests output from the application program 201 to the port handler 221, and acquiring data sent from the hybrid device 10 in response to the commands.

The hybrid device 10 accordingly has a receive buffer 66 for temporarily storing commands and data sent from the host computer 200 through the serial interface 43, and a receive buffer 67 for temporarily storing commands and data sent from the host computer 200 through the USB interface 44.

The hybrid device 10 can be connected to the host computer 200 through either or both the serial interface 43 and USB interface 44, and in this embodiment of the invention both the serial interface 43 and USB interface 44 are connected to the host computer 200.

The hybrid device 10 also has a control unit 70 (execution control unit) that executes commands stored in the receive buffers 66, 67. This control unit 70 is rendered by the CPU 40 (FIG. 4) running a control program.

The control unit 70 can switch the operating mode between a printer control mode 71, scanner control mode 75, MICR control mode 72, and MSR control mode 73.

The printer control mode 71 is an operating mode (command system) for executing printing functions. In the printer control mode 71, text and images are formed on the recording medium S as a result of the gate array 45, motor driver 46, and head driver 48 shown in FIG. 4 driving the media conveyance motor 26, carriage drive motor 56, alignment motor 58, and recording head 18 based on the detected values output by the alignment sensors 39, media edge sensors 47, and media width sensor 55. Content is printed line by line in the printer control mode 71, and the recording medium S is appropriately conveyed by the media conveyance mechanism 100 to move to the printing start position, advance the medium between lines, and discharge the medium after printing is completed. The parts related to these printing functions embody a printing unit as a process unit.

The scanner control mode 75 is an operating mode for optically reading the recording medium S by the optical reader 110. The scanner control mode 75 controls the gate array 45 and motor driver 46, drives the media conveyance motor 26 and conveys the recording medium S as required based on the output detection signals from the media edge sensors 47 and media width sensor 55, and captures the data output by the first scanner module 111 and second scanner module 112. The optical reader 110 rendering this scanner function embodies a reading unit as a process unit.

The MICR control mode 72 is the operating mode for reading magnetic ink characters recorded on the recording medium S. The MICR control mode 72 controls the gate array 45, motor driver 46, and head driver 48, drives the media conveyance motor 26, magnetic head drive motor 57, and magnetic head 34 based on the output detection signals from the media edge sensors 47 and media width sensor 55, and acquires and interprets the output detection values from the magnetic head 34.

The MSR control mode 73 is an operating mode for reading and writing information recorded in the magnetic stripe of the recording medium S. The MSR control mode 73 controls the gate array 45, motor driver 46, and head driver 48, drives the media conveyance motor 26, magnetic head drive motor 57, and magnetic head 34, and conveys the recording medium S as needed based on the output detection signals from the media edge sensors 47 and media width sensor 55 to acquire the output values from the magnetic head 34 and read the magnetic stripe or write information to the magnetic stripe.

The hybrid device 10 can be used as a replacement for a printer that only has printing functions, or a conventional printer that also has a printing function, MSR function, and MICR function. More specifically, the hybrid device 10 can operate under the control of the MICR driver 213, MSR driver 215, and printer driver 217 of a host computer 200 that are written for a conventional printer. The command system L for the printer control mode 71 is a command system for controlling operation of the printing function in a printer according to the related art. The command system M for the MICR control mode 72 is a command system for controlling operation of the MICR function in a printer according to the related art, and the command system N for the MSR control mode 73 is a command system for controlling operation of the MSR function in a printer according to the related art. As a result, when the printer already connected to the host computer 200 is disconnected and replaced with the hybrid device 10, the host computer 200 can continue controlling the printer function, MICR function, and MSR function of the hybrid device 10 in the same way as the printer that was previously connected by using the existing MICR driver 213, MSR driver 215, and printer driver 217. These command systems and the commands used in each command system are stored in flash memory 42.

In this embodiment of the invention, the MICR driver 213, MSR driver 215, and printer driver 217 are driver programs that are compatible with older printers that have a serial interface or a parallel interface, and are not compatible with the USB interface. As a result, the MICR driver 213, MSR driver 215, and printer driver 217 output commands and data from the serial port 233 or parallel port 235. Commands and data for the printing function, MICR function, and MSR function are input from the host computer 200 to the serial interface 43 and stored in receive buffer 66.

The scanner driver 211 of the host computer 200 in this embodiment of the invention is compatible with the USB interface, however, and communicates commands and data with the hybrid device 10 through the USB port 231. Because the optical reader 110 is capable of high resolution color scanning as described above, the size of the captured image files can be extremely large. The scanner driver 211 therefore uses the USB port 231 because sending the scanned image data over a serial interface or parallel interface is not practical. Commands and data for the scanner function are therefore input to the USB interface 44 of the hybrid device 10, and are stored in the receive buffer 67 disposed for the USB interface 44.

The plural functions that can be executed by the hybrid device 10 are therefore divided into printing, MICR, and MSR functions that use the serial interface 43, and a scanner function that uses the USB interface 44. In other words, an interface is assigned to each process unit with a different function (operation), and the receive buffers 66, 67 are assigned to the interfaces according to the combination of processes. As a result, the control unit 70 references receive buffer 66 when executing commands for the print unit, and reads the receive buffer 67 when executing commands for the optical reader 110.

In addition, when the same interface is used, the control unit 70 reads the commands from a receive port not shown of the hybrid device 10, and allocates commands to the receive buffers 66, 67 based on the command system. Commands for the print function command system, for example, start with an ESC code, commands for the scanner function start with a GS code, and commands can thus be differentiated by the start code. The CPU 40 can differentiate these start codes, ESC and GS, and appropriately allocate commands to the receive buffers 66, 67 in RAM 41.

The hybrid device 10 stores the commands received from the host computer 200 in the order received to the receive buffers 66, 67, and the control unit 70 reads and executes commands that have not been executed and are stored in the receive buffers 66, 67. The control unit 70 usually executes the entire command sequence including the read command, pauses operation when there are no un-executed commands left in the receive buffer from which the commands were read, and then references the receive buffers 66, 67 and reads the next command to be executed. The hybrid device 10 can both print to and scan a single recording medium S, and can switch between functions to execute a continuous sequence of operations, but an unnecessary delay (wait time) occurs when the operation is paused while changing functions. The hybrid device 10 according to this embodiment of the invention is therefore configured to quickly switch between and execute a plurality of functions according to the received commands when commands for a plurality of functions are received from the host computer 200.

Figure 6:
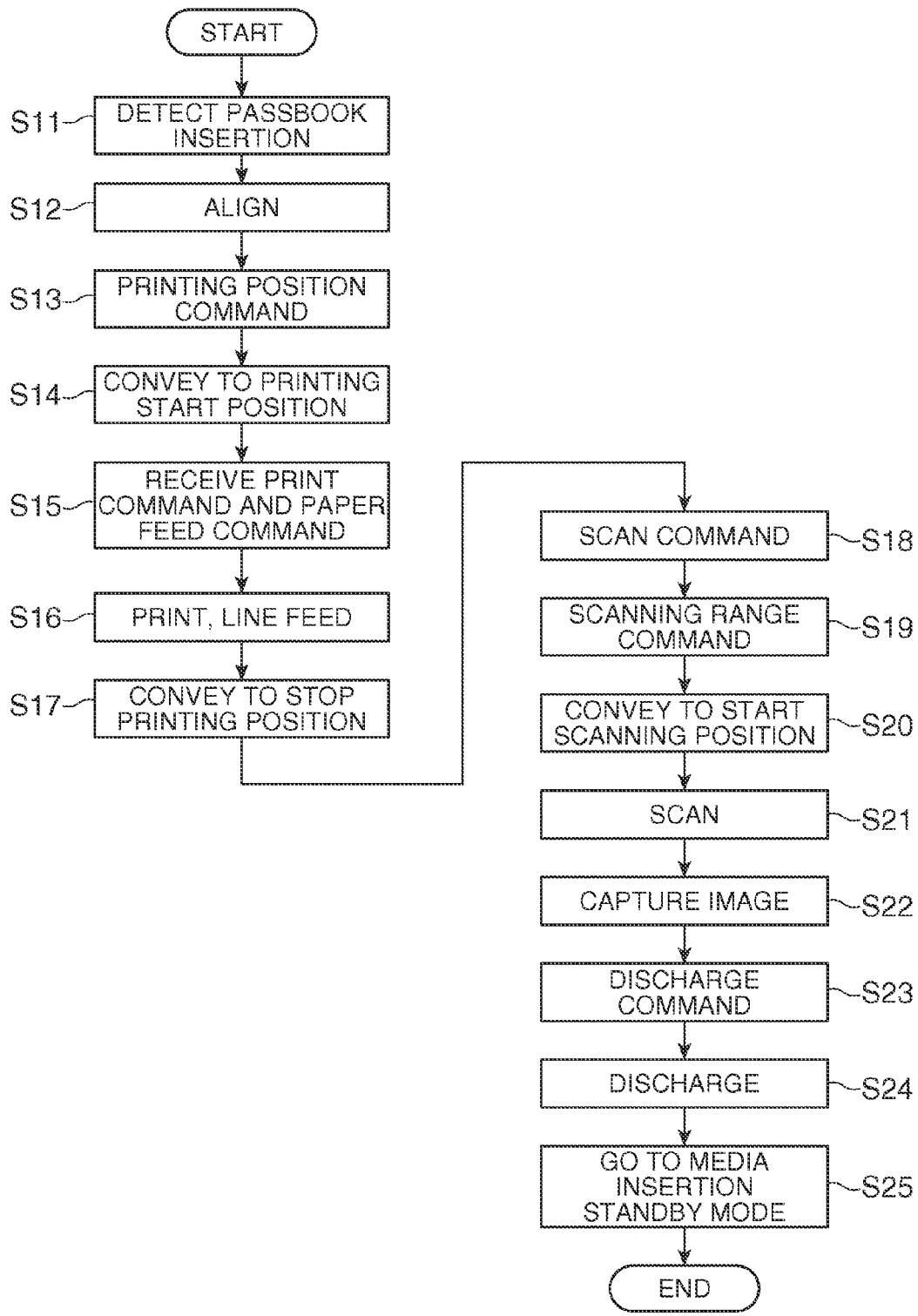
FIG. 6 is a flowchart showing an example of hybrid device operation.

FIG. 6 is a flow chart showing an example of the operation of the hybrid device 10.

The operation described by example in FIG. 6 is the operation performed when a passbook is inserted from the manual insertion opening 15 as the recording medium S to print on the passbook, optically read (scan) the printed portion, and then discharge the passbook.

When the control unit 70 detects based on output from the media edge sensors 47 that a passbook was inserted to the manual insertion opening 15 (step S11), it executes an alignment operation that controls the motor driver 46 to operate the alignment motor 58 and advance the alignment plate 38 into the conveyance path P while operating the media conveyance motor 26 to align the orientation of the passbook (step S12). The control unit 70 acquires the output values of the alignment sensors 39 from the gate array 45, and ends the alignment operation by operating the alignment motor 58 and retracting the alignment plate 38 after determining that the check is properly aligned.

The control unit 70 then references the commands sent from the host computer 200 and stored in the receive buffer 66, reads the command specifying the printing start position (step S13), changes the operating mode to the printer control mode 71, and conveys the passbook to the printing start position according to the command. More specifically, the control unit 70 controls the motor driver 46 and drives the media conveyance motor 26 to convey the passbook to the printing start position (step S14). Next, when a print command and conveyance command are received from the host computer 200 and stored in the receive buffer 66 (step S15), the control unit 70 reads and executes the print command and paper feed command from the receive buffer 66. The control unit 70 drives the media conveyance motor 26 and carriage drive motor 56, controls the head driver 48 and prints by the recording head 18, and advances the passbook one line each time printing one line ends (step S16). When this printing sequence ends, the control unit 70 drives the media conveyance motor 26 and conveys the passbook to the stop printing position (step S17).

When a scan command is then sent (step S18) and a scanning range command specifying the area to be scanned is sent (step S19) from the host computer 200 and stored in the receive buffer 67, the control unit 70 reads the scan command stored in the receive buffer 67 and changes the operating mode to the scanner control mode 75. More specifically, the control unit 70 controls the motor driver 46 and operates the media conveyance motor 26 to convey the passbook to the start scanning position (step S20). The control unit 70 then operates the media conveyance motor 26, gets the output data of the first scanner module 111 and second scanner module 112 from the gate array 45, and scans (step S21). The control unit 70 then interprets the acquired output data of the first scanner module 111 and second scanner module 112, and scans both scanning surfaces of the passbook (step S22). When the discharge command is sent from the host computer 200 after finishing scanning the area specified by the scanning range command (step S23), the control unit 70 receives and executes the discharge command, drives the media conveyance motor 26 and discharges the passbook from the manual insertion opening 15 or the paper exit 20 (step S24), then returns the standby mode to wait for insertion of the next recording medium S (step S25), and ends this process.

The control unit 70 thus executes commands in an operating mode appropriate to the commands sent from the host computer 200, thereby renders a printer function, scanner function, MICR function, and MSR function, and processes a single recording medium S (a passbook in this example) by changing between a plurality of functions.

To quickly switch between and execute multiple functions as described above, the hybrid device 10 executes commands in one receive buffer 66 while reading the other receive buffer 67, and if there is a command that has not been executed in the receive buffer 67, reads this unexecuted command first and enters an execution standby state. As a result, after executing one command the hybrid device 10 can quickly execute the next command waiting to be executed, and can quickly change the operating mode when the operating mode for the command to be executed differs from the current operating mode. This method of executing commands from one buffer while watching another buffer to determine the next command to be read is used only when specific conditions are set and those conditions are satisfied. This control method is described below.

Figure 7:
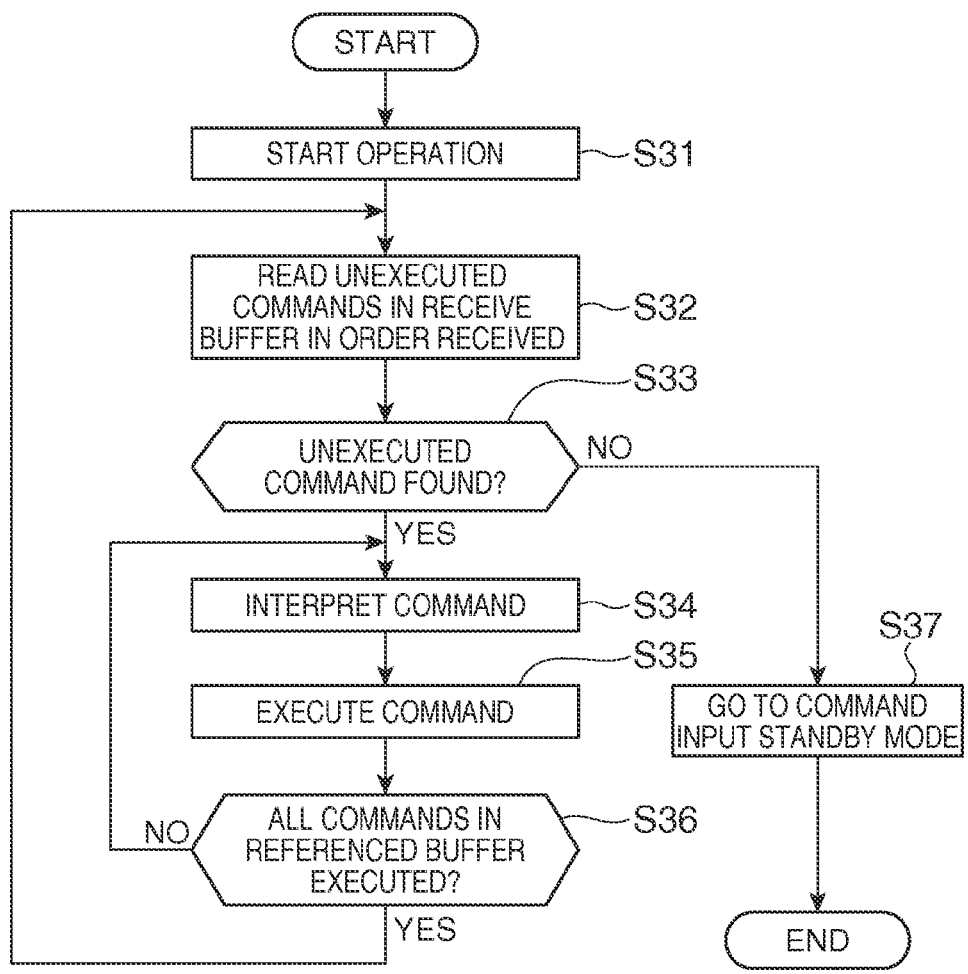
FIG. 7 is a flowchart of command execution by the hybrid device.
Figure 8:
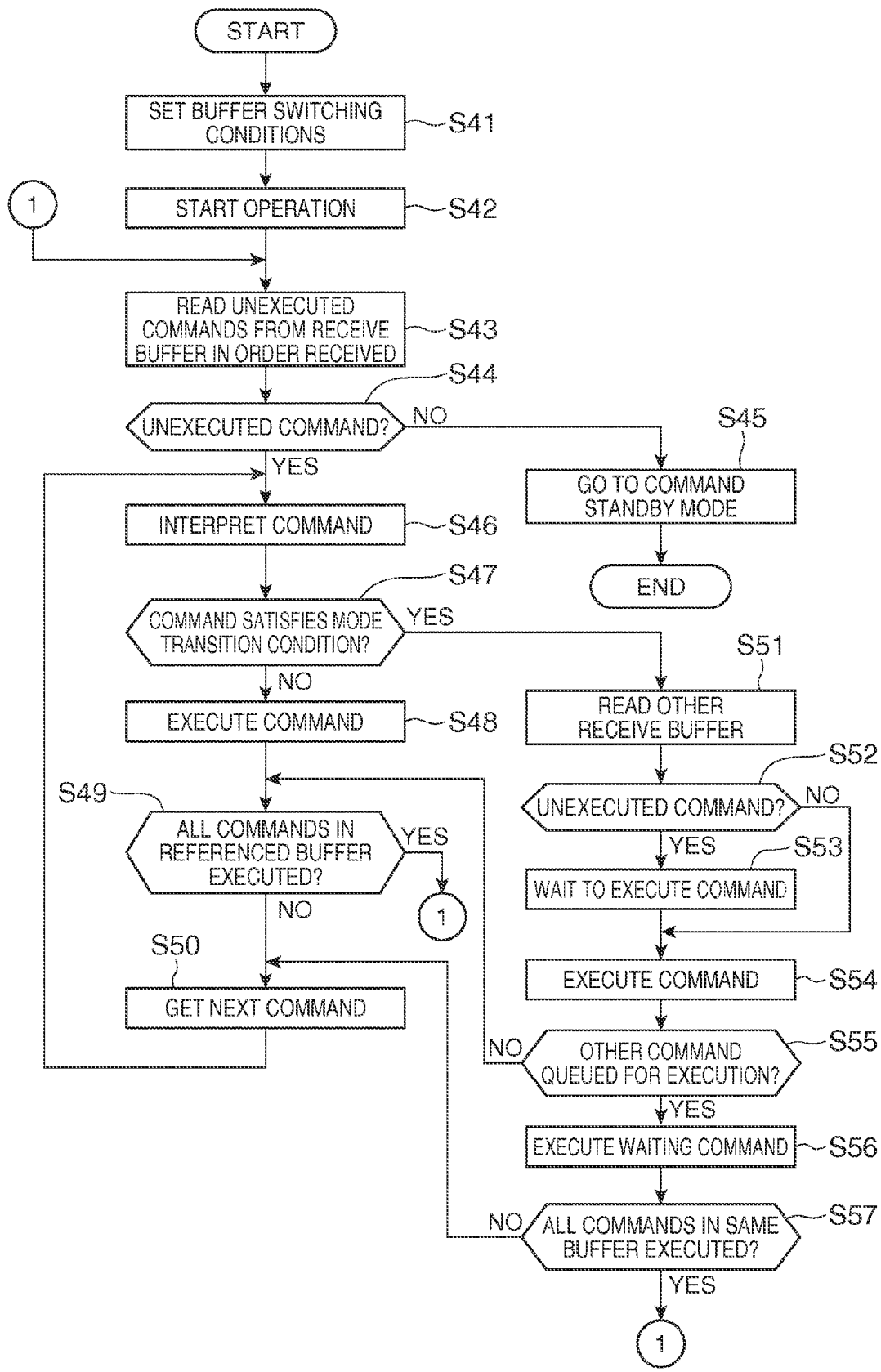
FIG. 8 is a flowchart of command execution by the hybrid device.

FIG. 7 and FIG. 8 are flow charts describing command execution by the hybrid device 10. FIG. 7 describes operation when referencing another receive buffer while executing a command is not enabled, and FIG. 8 describes operation when this setting is enabled.

When operation starts (step S31), the control unit 70 reads the unexecuted commands (that is, commands that have been received and stored but not executed) stored in the receive buffers 66, 67 in the order received from the host computer 200 (step S32). Because the control unit 70 cannot read receive buffer 66 and receive buffer 67 simultaneously, the receive buffer storing the command that was received first is read first.

The control unit 70 determines if there is an unexecuted command in the referenced receive buffer (step S33). If there is an unexecuted command (step S33 returns Yes), the control unit 70 interprets the command (step S34), changes to the operating mode corresponding to the command, and executes the command (step S35). When executing the command is completed, the control unit 70 determines if all unexecuted commands in the receive buffer currently being referenced have been executed (step S36). More specifically, after reading and executing one command from either receive buffer 66, 67, the control unit 70 continues executing unexecuted commands from the same receive buffer. If there is still an unexecuted command in the receive buffer being referenced (step S36 returns No), the control unit 70 returns to step S34 and interprets the next command. If all unexecuted commands in the receive buffer being referenced have been executed (step S36 returns Yes), the control unit 70 returns to step S32, changes the referenced receive buffer, and looks for the next unexecuted command.

If an unexecuted command is not found in either receive buffer 66, 67 (step S33 returns No), the control unit 70 goes to the standby mode until a command is received from the host computer 200 (step S37), and ends this operation.

During normal operation, the control unit 70 thus executes unexecuted commands in the receive buffers 66, 67 in the order received, and after reading and executing one command from one receive buffer, continues executing unexecuted commands from the same receive buffer.

FIG. 8 describes an example of operation when there is a function that, when enabled by a command from the host computer 200, can read and execute commands in another receive buffer before all unexecuted commands in one receive buffer have been executed.

In the operation shown in FIG. 8, the control unit 70 starts operating in the scanner control mode 75. When a command for a function other than the scanner function is executed, the operating mode changes and operation returns to the scanner control mode 75 mode after executing the other command. As a result, the operation of referencing receive buffers 66, 67 is performed as part of the scanner control mode 75 function. As described above, the printer control mode 71, MICR control mode 72, and MSR control mode 73 must function in the same way as an older printer, and adding new commands to the command system is difficult. However, because the scanner driver 211 and scanner control mode 75 do not require compatibility with an older printer, commands for functions not previously available can be added to the scanner command system K. As a result, a function for setting the conditions for changing the receive buffer that is referenced can be realized by a new command added to command system K.

In the operation shown in FIG. 8 the control unit 70 starts operating in the scanner control mode 75, and sets the buffer switching conditions (configuration conditions) for changing the receive buffer being read to another receive buffer according to a dedicated command sent from the host computer 200 to the USB interface 44 in flash memory 42 (step S41). The buffer switching conditions can be a specific command or a combination of specific commands, for example. The receive buffer that is referenced is changed when this specific command or a combination of specific commands is received.

The control unit 70 starts the operation processing the recording medium S in the scanner control mode 75 (step S42), and sequentially references the unexecuted commands stored in receive buffers 66, 67 in the order they were received from the host computer 200 (step S43). The control unit 70 determines if there are unexecuted commands in the referenced receive buffer (step S44). If there are no unexecuted commands in either of the receive buffers 66, 67 (step S44 returns No), the control unit 70 goes to a standby mode until a command is received from the host computer 200 (step S45), and ends this operation. Whether a recording medium S is at the recording head 18 when entering the standby mode is detected from a sensor, and if a recording medium S is not detected, a warning is issued by a warning unit to prompt loading the recording medium S, and the carriage drive motor is energized or other mechanical preparation step performed so that operation can start immediately.

If there is an unexecuted command in either of the receive buffers 66, 67 (step S44 returns Yes), the control unit 70 reads and interprets the command (step S46). This interpretation is done as a function of the scanner control mode 75. The control unit 70 then determines if the single interpreted command, or a plurality of commands received consecutively or together, meets the condition set in step S41 (step S47). If the command or combination of commands does not meet the condition for changing operating modes (step S47 returns No), the control unit 70 changes to the operating mode for executing the interpreted command, and executes the command (step S48). When executing the command is completed, the control unit 70 changes the operating mode to the scanner control mode 75, and determines if all unexecuted commands in the receive buffer being referenced have been executed (step S49). If an unexecuted command is left in the receive buffer (step S49 returns No), the control unit 70 reads the next unexecuted command (step S50), and returns to step S46 and executes the command. If all unexecuted commands in the receive buffer being read have been executed (step S49 returns Yes), the control unit 70 returns to step S43.

If the command or combination of commands meets the condition for changing operating modes (step S47 returns Yes), the control unit 70 references a buffer other than the receive buffer from which the interpreted command was read (step S51), and determines if there is an unexecuted command (step S52). If there is an unexecuted command in this receive buffer (step S52 returns Yes), the control unit 70 reads the command, identifies the operating mode corresponding to the command, and goes to the identified operating mode and enters the command execution standby state (step S53).

The command execution standby state is a state in which commands can be executed immediately. In this step S53, the control unit 70 temporarily changes the operating mode and reads the command, for example, waits until just before a signal is output in this operating mode to the operating unit of the hybrid device 10 (that is, the gate array 45, motor driver 46, head driver 48, and parts connected thereto), and then returns the operating mode to the scanner control mode 75. In another example of the command execution standby state, the scanner control mode 75 could simply temporarily store the next command to execute and the operating mode corresponding to that command.

The control unit 70 then switches to the operating mode corresponding to the command interpreted in step S46, and executes the command (step S54). If an unexecuted command is not found in a different receive buffer than the command interpreted in step S46 (step S52 returns No), control goes to step S54 and the command is executed.

When command execution is completed, the control unit 70 changes the operating mode to the scanner control mode 75, determines if a command is waiting in the command execution standby state (step S55), and goes to step S49 if there is no command queued in the command execution standby state (step S55 returns No). If there is a command queued in the command execution standby state (step S55 returns Yes), the control unit 70 changes the operating mode corresponding to the command waiting in the command execution standby state, and executes that command (step S56). The control unit 70 then changes the operating mode to the scanner control mode 75, and determines if all unexecuted commands in the receive buffer being read, that is, all unexecuted commands in the same receive buffer as the command queued in the command execution standby state, have been executed (step S57). If an unexecuted command remains in the receive buffer (step S57 returns No), control goes to step S50, the next unexecuted command is read, and control returns to step S46 and the command is interpreted. If all unexecuted commands in the receive buffer being referenced have been executed (step S57 returns No), control goes to step S43.

As described above, a hybrid device 10 according to the preferred embodiment of the invention described above has a plurality of process units, and can perform plural different types of processes with a recording medium S based on commands sent from the host computer 200. If while executing a specific process command for a particular process performed by one process unit the control unit 70 receives another process command for a different process performed by another process unit, the control unit 70 sets this other process command to the command execution standby state and executes the specific process command, and after executing this specific process command, executes the other process command that is waiting in the command execution standby state. For example, if a scan command for the optical reader 110 to scan the recording medium S being printed is received while executing a print command for a printing process by the print unit, the control unit 70 sets the scan command to a command execution standby state, executes the print command, and after executing the print command executes the scan command that is queued in the command execution standby state. Because operation can switch quickly from one operating mode to another operating mode when plural operations are performed on a single recording medium S, the waiting time involved with switching operation is shortened and throughput can be improved.

The hybrid device 10 also has a plurality of receive buffers 66, 67 that store commands received from the host computer 200, the receive buffers 66, 67 correspond to commands associated with the optical reader 110 and print unit, which are exemplary process units, and while executing commands for processes associated with one process unit the control unit 70 monitors the receive buffer associated with the other process unit. For example, while executing print commands by the print unit, the control unit 70 reads the receive buffer 67 that stores commands for the scanner function, and when an execution command is stored in the receive buffer 67, sets that execution command to a command execution standby state. Therefore, commands associated with different operations can be referenced by changing the receive buffer, whether or not there are any unexecuted commands can be quickly determined, and operation can be quickly changed.

The command system for one process unit and the command system for another process unit are different. For example, the command system L used with the print unit associated with print functions is different from the command system used for scanner functions. By thus grouping the commands used for each process unit into command systems that differentiate information contained in the commands by specific rules, command systems (command groups) that differ by process unit can be differentiated, and commands received from the host computer 200 can be distributed to receive buffers reserved for specific process units.

When a command for a specific process satisfies predetermined conditions, the control unit 70 reads the receive buffer associated with another process unit, and when the command to be executed does not satisfy the condition, continues executing commands in the same receive buffer storing the command specifying the specific process. For example, a command for the scanner control mode 75 is set to be performed by the control unit 70 conditionally on a particular combination of print commands and conveyance commands. When commands satisfying this condition, that is, a print command and a paper feed command, are sent together from the host computer 200, the control unit 70 reads the receive buffer 67 when executing the print command and conveyance command, queues a scan command in the command execution standby state if a scan command is received, and executes the print command and paper feed command. If a command other than a command that satisfies these conditions is read and executed from the receive buffer 66, the commands stored in the receive buffer 66 are executed until there are no unexecuted commands left in the receive buffer 66. As a result, operation can be changed quickly only when necessary, and the same type of operation can be executed continuously without frequently changing the operating mode.

A preferred embodiment of the invention is described above, but the invention is not limited thereto. For example, the foregoing embodiment describes a configuration having a receive buffer 66 for the printer control mode 71, MICR control mode 72, and MSR control mode 73 of the control unit 70, and a receive buffer 67 for the scanner control mode 75, but the invention is not so limited. For example, the number of receive buffers can be determined as needed, and receive buffers could be provided individually for the printer control mode 71, MICR control mode 72, MSR control mode 73, and scanner control mode 75. The different receive buffers can also be embodied by dividing a single physical memory device into plural logical constructions. Yet further, the hybrid device 10 could have a 10/100 Base-T Ethernet (R) LAN interface, or a wireless communication interface, instead of or in addition to the serial interface 43 and USB interface 44. When particular functions correspond to particular interfaces in this configuration, a receive buffer can be provided for each interface. In addition, the hybrid device 10 is not limited to printing, MICR, MSR, and scanner functions, and other types of functions can obviously be implemented.

The circuits disposed to the control circuit board (not shown in the figure) installed in the hybrid device 10 according to the above embodiment of the invention render the functions shown in the function block diagrams in FIG. 4 and FIG. 5, but a device externally connected to the hybrid device 10 could function as part or all of the function units shown in FIG. 4, and control the hybrid device 10.

In addition, the function blocks shown in FIG. 4 and FIG. 5 are achieved by cooperation between hardware and software, but the specifics of the hardware and software configurations can be determined as desired, and other detailed aspects of the configuration can be changed as desired.

The foregoing embodiment describes a hybrid device 10 having a SIDM recording head 18, magnetic head 34, and optical reader 110, but the invention is not so limited and can obviously be adapted to other configurations having an optical reading unit equivalent to the optical reader 110 disposed to an inkjet printer, thermal printer, or laser printer, for example. The invention is also not limited to stand-alone devices, and the invention can obviously be adapted to devices that are incorporated into another device such as an ATM (automated teller machine) or cash dispenser.

A program that implements the steps shown in FIG. 6 to FIG. 8 may be stored in a storage medium in the hybrid device 10 or a storage medium externally connected to the hybrid device 10, and can be read therefrom and executed by the control unit 70.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A hybrid device that can connect to a host computer, comprising:
at least a first process unit and a second process unit;
a storage unit that stores a first command group used with the first process unit and a second command group used with the second process unit;
a first reception unit for the first command and a second reception unit for the second command group that store commands received from the host computer: and
a command execution control unit that performs a process on a processed medium based on a command of the first command group received from the host computer, and performs a process on the processed medium based on a command of the second command group received from the host computer;
wherein:
if the command execution control unit receives a separate process command of the second command group controlling applying a separate process of the second process unit to the processed medium before or while executing a specific process command of the first command group that specifies applying a specific process of the first process unit to the processed medium, the command execution control unit executes or continues the specific process command of the first command group after setting the separate process command of the second command group to the command execution standby state, and after completing the specific process of the first command group executes the separate process command of the second command group queued in the command execution standby state;
the command execution control unit references the second reception unit before or while executing a specific process command stored in the first reception unit, and if a command is stored in the second reception unit, sets said command as the separate process command queued in the command execution standby state;
the storage unit stores a specific configuration condition, and the command execution control unit references the second reception unit when the specific configuration condition is satisfied before or while executing the specific process command, and does not reference the second reception unit when the specific configuration condition is not satisfied; and
when the specific configuration condition is not satisfied before or while executing the specific process command, the command execution control unit executes a command from the first reception unit where the specified process command was stored after completing execution of the specific process command.

2. The hybrid device described in claim 1, wherein:
the first command group and second command group are different.

3. The hybrid device described in claim 1, wherein:
the first process unit is a printing unit;
the second process unit is a reading unit; and
the command execution control unit performs a printing process of the print unit on the processed medium based on a command of the first command group received from the host computer, and
performs a reading process of the reading unit on the processed medium based on a command of the second command group received from the host computer.

4. A control method for a hybrid device that has at least a first process unit and a second process unit and can connect to a host computer, wherein:
if a separate process command of a second command group controlling applying a separate process of the second process unit to a processed medium is received before or while executing a specific process command of a first command group that specifies applying a specific process of the first process unit to the processed medium, the specific process command of the first command group executes or continues after setting the separate process command of the second command group to a command execution standby state, and the separate process command of the second command group queued in the command execution standby state executes after the specific process command of the first command group ends;

wherein:

the hybrid device also has a first reception unit for the first command group and a second reception unit for the second command group that store commands received from the host computer;

the control method includes steps of referencing the second reception unit before or while executing a specific process command stored in the first reception unit, and if a command is stored in the second reception unit, settings said command as the separate process command queued in the command execution standby state: and when a specific configuration condition is not satisfied before or while executing the specific process command, a command from the first reception unit where the specified process command was stored is executed after execution of the specific process command is completed.

5. The control method for a hybrid device according to claim 4, wherein:

the first command group and second command group are different.

6. The control method for a hybrid device according to claim 4, wherein:

the second reception unit is referenced when the specific configuration condition is satisfied before or while executing the specific process command, and the second reception unit is not referenced when the specific configuration condition is not satisfied.

7. The control method for a hybrid device according to claim 4, wherein:

the first process unit is a printing unit;

the second process unit is a reading unit;

a printing process of the print unit is performed on the processed medium based on a command of the first command group received from the host computer, and a reading process of the reading unit is performed on the processed medium based on a command of the second command group received from the host computer.

8. A non-transitory storage medium that stores a program that can be executed by a control unit that controls at least a first process unit and a second process unit of a hybrid device that can connect to a host computer, wherein:

if a separate process command of a second command group controlling applying a separate process of the second process unit to a processed medium is received before or while executing a specific process command of a first command group that specifies applying a specific process of the first process unit to the processed medium, the specific process command of the first command group executes or continues after setting the separate process command of the second command group to the a command execution standby state, and the separate process command of the second command group queued in the command execution standby state executes after the specific process of the first command group ends;

wherein:

the hybrid device also has a first reception unit for the first command group and a second reception unit for the second command group that store commands received from the host computer:

the program includes steps of referencing the second reception unit before or while executing a specific process command stored in the first reception unit, and if a command is stored in the second reception unit, setting said command as the separate process command queued in the command execution standby state; and when a specific configuration condition is not satisfied before or while executing the specific process command, a command from the first reception unit where the specified process command was stored is executed after execution of the specific process command is completed.

* * * * *